United States Patent [19]

Vogelsberg et al.

[11] 4,214,430
[45] Jul. 29, 1980

[54] METHOD AND APPARATUS FOR THE LAYERWISE SZ-STRANDING OF ELEMENTS TO BE STRANDED ABOUT A FLEXIBLE CORE STRAND

[75] Inventors: Dieter Vogelsberg, Coburg; Helmut Pascher, Munich, both of Fed. Rep. of Germany

[73] Assignee: Siemens Aktiengesellschaft, Munich, Fed. Rep. of Germany

[21] Appl. No.: 6,797

[22] Filed: Jan. 25, 1979

[30] Foreign Application Priority Data

Jan. 31, 1978 [DE] Fed. Rep. of Germany ....... 2804480

[51] Int. Cl.² .................... H01B 13/02; D07B 3/00
[52] U.S. Cl. ................................ 57/6; 57/293; 57/294
[58] Field of Search ............... 57/6, 9, 13–15, 57/293, 294

[56] References Cited

U.S. PATENT DOCUMENTS

| | | | |
|---|---|---|---|
| 2,924,930 | 2/1960 | Crosby et al. | 57/293 |
| 3,133,402 | 5/1964 | Zwolinski et al. | 57/293 |
| 3,187,495 | 6/1965 | Christian, Jr. | 57/293 |
| 3,643,411 | 2/1972 | Vogelsberg | 57/294 |
| 3,847,190 | 11/1974 | Forester | 57/293 X |
| 4,056,925 | 11/1977 | Vogelsberg | 57/293 |
| 4,100,721 | 7/1978 | Seiichi et al. | 57/294 |
| 4,127,982 | 12/1978 | Braun et al. | 57/294 |

*Primary Examiner*—John Petrakes
*Attorney, Agent, or Firm*—Kenyon & Kenyon

[57] ABSTRACT

For the layer-wise SZ-stranding of elements to be stranded about a core strand, the elements to be stranded are first temporarily cabled onto the core strand with a long lay and alternating direction of lay, subsequently roped down from the core strand by means of a first cabling disc and fed, parallel to the core strand, to a second, oscillating cabling disc by means of which the final stranding is accomplished. The two cabling discs advantageously form the end faces of a twisting cage which revolves with alternating direction of rotation, with the distance of a first twisting closer, into which the core strand and the elements to be cabled enter, from the first cabling disc and the distance of the first cabling disc from the second cabling disc larger than the distance of the twist reversal points in the finished stranded material.

10 Claims, 4 Drawing Figures

METHOD AND APPARATUS FOR THE LAYERWISE SZ-STRANDING OF ELEMENTS TO BE STRANDED ABOUT A FLEXIBLE CORE STRAND

BACKGROUND OF THE INVENTION

The invention relates to the layerwise SZ stranding of elements to be stranded, for instance, to the stranding of elements of electric cables, such as wires, conductors, conductor pairs or star quads, or also to the stranding of optical transmission elements for optical cables such as are being used more recently in the field of communication cable technology.

Various methods and apparatus for the layerwise SZ twisting of elements to be twisted have been developed since the beginnings of SZ twisting. In general, a cabling disc revolving with alternating direction of rotation has essentially been provided as the twisting member proper for this purpose.

A particular difficulty in the development of suitable methods and machine designs for layerwise SZ twisting is the requirement that the twisting should lead to distances as large as possible between the reversal points of the twist direction in the stranded material produced. It has been possible to increase the original distances of about one twist length (U.S. Pat. No. 2,924,930) to two or three times that amount by using additional cabling discs. The additional cabling discs then form, ahead of the main cabling apparatus, a device for suppressing undesired entanglements (U.S. Pat. Nos. 3,187,495 and 3,133,402) as well as also a kind of storage for the twisting lays executed by the cabling disc in the backward direction. In the simplest case, a single additional cabling disc is provided, which is arranged fixed at a considerable distance ahead of the oscillating cabling disc and serves merely for the defined feeding of the elements to be twisted to the oscillating cabling disc (German Offenlegungsschrift 24 11 151, FIG. 1, and German Offenlegungsschrift 24 55 062, FIGS. 1 and 2). A tube, onto which the twist lays are placed, can be arranged between the stationary and the oscillating cabling disc. However, the storage capacity of such a tube is small because of the friction losses.

The storage capacity of the storage device arranged ahead of the twisting means and thereby, the distance of the reversal points of the twist direction in the twisted material can be increased by associating a relatively long, flexible tubular guide with each element to be twisted. The guide is arranged such that one end is rotatable with the twisting means and the other end is stationary (U.S. Pat. No. 3,847,190). The application of such a storage device to the layerwise stranding of elements to be stranded leads to difficulties, however, because the axially fixed flexible tubular guides are then stranded on the core strand which is being transported axially.

For the normal SZ twisting of elements to be twisted, in which the elements to be twisted are twisted together not in layers but directly (in bundles), apparatus is furthermore known which likewise contains an oscillating cabling disc as the twisting means proper and in which the twist angle is increased substantially by the provision that a twisting closer into which the elements to be twisted run, is disposed at a fairly large distance ahead of the cabling disc. This does not suppress the twisting action exerted by the cabling disc in the backward direction but brings it on intentionally, and distributes it over a longer section of the material to be twisted (U.S. Pat. No. 4,056,925).

SUMMARY OF THE INVENTION

The present invention starts out from a method for the layerwise stranding of elements to be stranded, especially of elements of electric cables, about a flexible core strand, in which the elements to be stranded continually run off from stationary supplies and are temporarily run concentrically to the core strand which is held stretched, whereby stranding lays are stored, and in which the elements to be stranded are guided around the core strand (or the stranding axis) in directions alternating at intervals and, in the process, are cabled onto the core strand, which is guided in a manner secure against torsion, with a difinite length of lay and with alternating direction of lay. It is an object of the present invention to improve such a method to the end that, with few and simple steps, a larger number of lays with the same direction of lay can be applied, so that the distance between reversal points of the twist direction in the finished stranded material is at least several lays.

According to the present invention, in order to solve this problem, for the purpose of temporary storage of twisting lays, the elements to be stranded are first temporarily cabled on the core strand with directions of lay alternating at intervals, are subsequently unroped from the core strand by being guided around the latter synchronously with the final stranding and are then fed to the final cabling operation, spaced from and parallel to the core strand, which is conducted freely torsionable, or spaced from and parallel to the stranding axis, respectively.

In such a stranding method, the core strand itself is used, in temporarily stranding the elements to be stranded onto the core strand, as the satorage element for the twisting lays exerted by the cabling disc in the backward direction. Since this storage element can be chosen almost arbitrarily long without special measures, the spacing of the reversal points of the twist direction of the final stranding can likewise be chosen almost arbitrary, since this spacing corresponds to the capacity of the storage element. For the torsioning of the core strand which takes place for the purpose of temporarily storing twisting lays on the core strand, it is important in this connection that the elements to be stranded are subsequently conducted parallel to and spaced from the core strand, which is held freely torsionable, so that the core strand does not rotate synchronously with the elements to be stranded about its own axis when the elements to be stranded are cabled up finally. For, such rotation would mean that the core strand is torsioned with the same or approximately the same length of lay, and with the same direction of lay, with which the elements to be stranded are cabled onto the core strand, i.e., the elements to be stranded would not be twisted relative to the core strand.

For implementing the new stranding method, apparatus which includes: first, supplies for the elements to be twisted, arranged in a stationary manner; an unwind and a take up device for the stranded material; and a twisting device arranged in between, in which the twisting device for stranding the elements to be stranded contains essentially an oscillating cabling disc and, for guiding the elements to be stranded, a further cabling disc arranged at a distance ahead thereof, is particularly well suited. In a further embodiment of the invention, the further cabling disc is mechanically coupled to the oscillating cabling disc with respect to the rotary motion of the latter, and ahead of the further cabling disc, a twisting closer for receiving the core strand as well as the elements to be stranded is arranged. The distance of the twisting closer from the further cabling disc as well as the distance of the further cabling disc from the oscillating cabling disc is larger than the disatance of the twist reversal points in the finished stranded material.

Such apparatus therefore comprises, as far as the stranding part is concerned, essentially a twisting closer, an oscillating cabling disc arranged behind the former at a distance, and a second oscillating cabling disc which is arranged behind it likewise at a distance and which is mechanically coupled to the first-mentioned cabling disc. The twisting closer, with which, advantageously, a torsion blocking device in the form of a perforated disc is associated, can also be replaced by a perforated disc in which the elements to be stranded are guided individually; during the twisting, a natural twisting point is then developed behind the perforated disc. It is advisable to make the pitch circle diameter as small as possible for this purpose.

The core strand, on which the elements to be stranded are to be cabled up, is conducted through the three elements, namely, the twisting closer and the first and second cabling discs, in stretched condition. The respective section of the core strand between the twisting closer and the first cabling disc serves as a carrier for the temporarily applied elements to be stranded, while the elements to be stranded in the region between the first cabling disc and the second cabling disc are conducted freely through air or through suitable tubular guides at a distance from the core strand. The distances of the further cabling disc from the twisting closer and the oscillating disc are chosen so that the elements to be stranded can be cabled up on the core strand, in the region between the twisting closer and the further cabling disc, with a length of lay which is greater than the length of lay of the final stranding. This is achieved by making these distances larger than the desired distance of the reversal points of the twist direction in the finished stranded material. With such a design, far-reaching equalization of the torsion stresses in the elements to be stranded can be achieved in the region between the two cabling discs. In that case, the elements to be stranded run into the twisting closer of the stranding device proper with a reverse twist. This, for instance, has the result that the reversal points of the twist direction have less of a tendency to spring open than would be the case without reverse twist.

The mentioned distances within the stranding apparatus are preferably made equal if stranding the elements to be stranded on the core strand is the sole purpose. If, however, the distance between the two cabling discs is chosen smaller than the distance between the twisting closer and the further cabling disc, it can then be achieved that the core strand also has a direction of lay alternating at intervals, the length of lay being smaller than the length of lay of the final stranding of the elements to be stranded.

In the operation of the stranding apparatus, the elements to be stranded are temporarily cabled on the core strand due to the rotary motion of the further cabling disc; due to this cabling, the core strand is set into a rotary motion following the rotary motion of the further cabling disc in the region between the twisting closer and the oscillating cabling disc. If no separate twisting head is associated with the further cabling disc, the elements to be stranded are wrapped around the core strand helically in the region between the twisting closer and the further cabling disc on a length varying with time. If, on the other hand, a further twisting head namely, a roping down head is arranged immediately ahead of the further cabling disc, then the elements to be stranded are always wrapped helically around the core strand on the entire length between the twisting closer and the last-mentioned roping down head.

To aid the torsion motion executed by the further cabling disc on the core strand via the elements to be stranded, it may be advantageous to arrange one or more twisting heads which embrace the material to be stranded tensionally from the outside and rotate about the stranding axais with alternating direction of rotation between the further cabling disc and the twisting closer. A first twisting head is advantageously arranged immediately ahead of the twisting closer associated with the further cabling disc and executes the same rotary motion as the further cabling disc. Optionally, further twisting heads can be used which have a speed of rotation between zero and the speed of rotation of the further cabling disc, depending on the location between the twisting closer and the further cabling disc. A twisting head arranged in the middle between the twisting closer and the further cabling disc, for instance, would revolve at one-half the speed of rotation of the further cabling disc. By means of such additional twisting heads, the stranding lays of the elements to be stranded, temporarily applied on the core strand, can be distributed as uniformly as possible on the core strand.

In further embodiments of the stranding apparatus, it can be advantageous to arrange the further cabling disc such that it is axially movable back and forth. The period of this reciprocating motion must then be matched to the periodic rotary movement of the further cabling disc. Also, in this manner, immediate accumulations of the stranding lays of the temporarily cabled elements to be stranded in front of the further cabling disc can be prevented and, instead, the preliminary stranding of the elements to be stranded is accomplished with constant length of lay.

Regardless of whether the further cabling disc is arranged so as to be movable back and forth, it is advantageous, for simplifying the mechanical design, if the oscillating cabling disc and the further cabling disc form the end faces of a twisting cage which contains guides for the elements to be stranded. In the simplest case, these guides can be holes arranged in the two cabling discs. However, tubular guides between the two cabling discs or further perforated discs mechanically coupled to the two cabling discs can be provided.

In the excution of the new stranding method, the length of the elements to be stranded, applied per unit length of the core strand, is larger after the final stranding than in the temporarily stranded condition. As a result, the core strand is upset at intervals in the region between the oscillating cabling disc and the further cabling disc. It is therefore advisable to guide the core strand, in the region between the oscillating cabling disc and the further cabling disc, in a tube, against the inside wall of which it can be laid in the form of a helix. Major length differences between the core strand and he elements to be stranded can then not add up, since the elements to be stranded run completely parallel to the stranding axis between the twisting closer and the further cabling disc, at intervals which correspond to the distance between the reversal points of the twist direction, and in this condition, missing lengths can be pulled from the supply of the elements to be stranded.

DETAILED DESCRIPTION OF THE INVENTION

Figure 1:
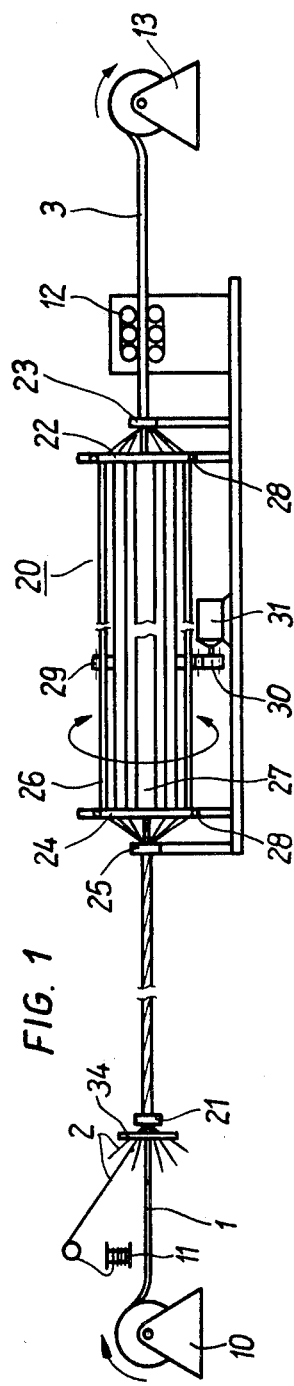
FIG. 1 is a schematic view of stranding apparatus according to the present invention.

FIG. 1 shows apparatus, by which elements 2 to be stranded are cabled into a core strand 1 with alternating direction of lay to form a stranded layer and, after the stranding, form stranded material 3. The elements to be stranded may be, for instance, wires for electric conductors for cables, conductors or groups of conductors of electric cables or also elements of optical cables to be stranded. The core strand can be, for instance, a support or reinforcing element, a single or several elements to be stranded together, or a cable conductor. The elements 2 to be stranded unwind from stationary supplies 11, while the core strand 1 unwinds from an unwinding device 10. The core strand 1 and the elements 2 to be stranded are pulled off by the pulling off device 12 and are wound up by means of the take up device 13.

The stranding of the elements 2 to be stranded onto the core strand 1 is accomplished by means of the stranding device 20 which is bounded on the entrance side by a twisting closer 21 with its associated perforated disc 34 and, on the exit side, by a twisting closer 23. The stranding means proper is a rotating twisting cage, which is formed by an oscillating cabling disc 22, a further cabling disc 24 and the tubular guides 26 for the elements 2 to stranded. This twisting cage is rotatably supported by means of bearings 28 and is driven by a motor 31 via a gear pair 29 and 30 in a direction of rotation which changes at intervals.

In the region of the twisting cage, the core strand 1 runs through a tubular guide 27, while a further twisting head, i.e., an unroping head 25 is associated with the further cabling disc 24.

When the stranding apparatus is in operation, a fairly large number of elements 2 to be stranded is applied concentrically onto the core strand 1 by means of the twisting closer 21. The core strand surounded by the layer of strands subsequently runs through free air for a considerable distance, for instance, several meters. By means of the unroping head 25 and the further cabling disc 24, which rotates alternatingly to the left and the right, of the twisting cage, the outer layer of strands is untwisted again. This further cabling disc 24 revolves synchronously with the oscillating cabling disc 22 which is arranged at a considerable distance, for instance, also at a distance of several meters, from the further cabling disc 24. Between the two cabling discs, the individual elements to be stranded run at a distance from and parallel to the core strand through air or are individually supported by tubular guides. Then, all the elements to be stranded execute a common rotary motion about the core strand 1 which runs through the tubular guide 27.

After leaving the oscillating cabling disc 22, the outer layer of strands is finally placed on the core strand 1 by means of the twisting closer 23 and is thereby given a lay direction alternating at intervals. A stationary caterpillar device, which is preferably also designed as a pulling off device 12 acts as an external fixed point for this stranding process in the illustrated embodiment.

Figure 2:
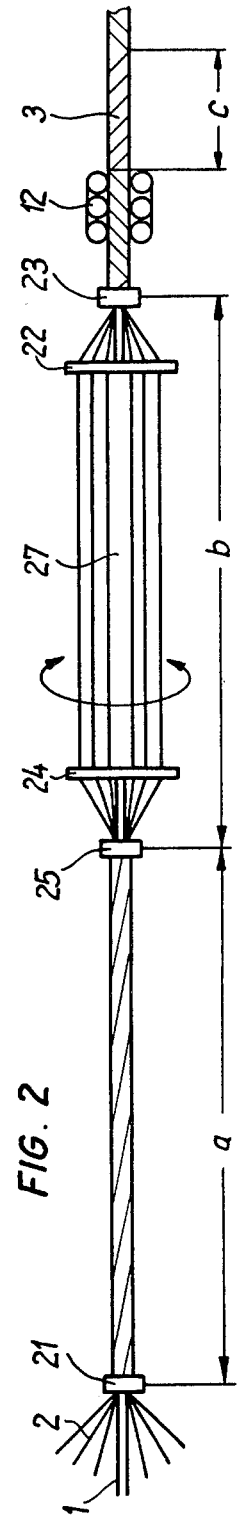
FIG. 2 is a diagrammatic view of the essential parts of the stranding apparatus of FIG. 1.

The essential parts of the stranding apparatus shown in FIG. 1 are shown once more diagrammatically in FIG. 2. The distance a between the twisting closer 21 and the unroping head 25 as well as the distance b between the unroping head 25 and the twisting closer 23 and the distance c, the spacing between reversal points of the twist direction in the finished stranded material, are indicated. The choice of the distances a, b and c is essential for proper operation of the stranding apparatus. The spacing c of the reversal points of the twist direction is determined by the pulling-off velocity v and the number of revolutions executed by the twisting cage in one respective direction with a constant speed of rotation n. The distances a and b are larger than the spacing c; they are, for instance, two to ten times larger. It is ensured in this manner that the length of lay of the temporary stranding in the region between the twisting closers 21 and 25 is substantially larger than the length of lay of the final stranding. During the temporary stranding, the elements to be stranded are therefore only lightly stressed mechanically by torsion and bending forces, and restranding by means of the further cabling disc presents no problem.

If the distances a and b are chosen very much larger than the distance c, then the core strand 1 is also torsioned only moderately before entering the twisting closer 23, i.e., its length of lay there is always considerably larger than the ultimate length of lay of the cabled-on layer of strands. Adequate torsional elasticity of the core strand is assumed here.

When carrying out the stranding method, the torsion of the core strand 1 in the region between the twisting heads 21 and 25 is accomplished by the rotary motion of the further cabling disc 24 in cooperation with the elements 2 to be stranded. Good transmission of the rotary motion of the cabling disc 24 to the core strand 1 is otherwise ensured if the distance b is chosen large enough. It is advisable to arrange the further twisting head, i.e., unroping head 25 approximately in the middle between the twisting closers 21 and 23.

In the ultimate layerwise SZ stranding of the elements to be stranded, reversal points of the twist direction come about at intervals, as they always do with SZ twisting. In order to prevent a later unraveling of these reversal points, a holding helix can be wrapped on the ultimately twisted stranding elements in a manner known per se, or an adhesive can be used. If bare conductors are twisted, the conductors can also be welded together at intervals over a length of a few centimeters. It may also be sufficient, in order to fix the reversal points, to compress the entire conductor cable, whereby the individual conductors are hooked together.

In the manufacture of conductor cables, the stranding apparatus shown is preferably connected with apparatus for extruding of the insulating layer. A plasting holding helix which may have been applied to the conductor cable, would then have to be so heat-resistant that it can withstand the extrusion temperatures. In certain cases, a metal holding helix can also be employed.

If conductor cables are stranded and subsequently compressed, it is advantageous to combine the compression head with the twisting closer 23. A multiple roller compression tool would then have to be arranged immediately behind the closer 23. This compression tool would then serve at the same time as a device which pevents torsion of the core strand 1 which is provided with the elements 2 to be stranded behind the twisting closer 23.

Figure 3:
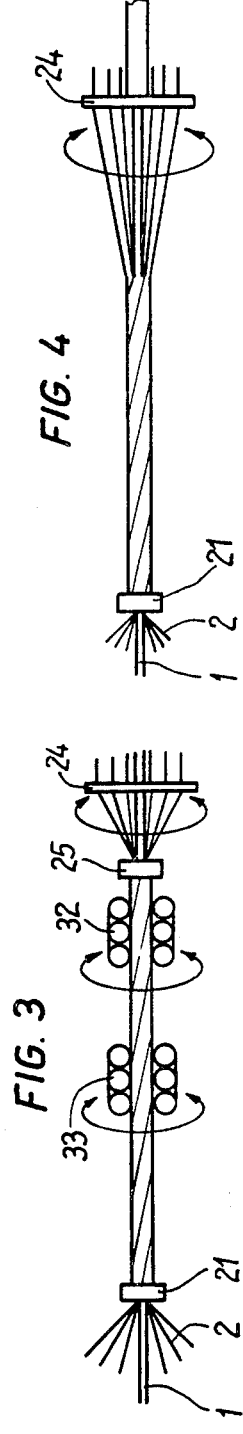
FIG. 3 is a diagrammatic illustration of a first modification to the embodiment of FIG. 2.

FIG. 3 shows diagrammatically that additional twisting heads can be arranged between the twisting heads 21 and 25 for aiding the twisting of the core strand 1, exerted by means of the further cabling disc 24, in the region between the twisting heads 21 and 25. The twisting head 32 arranged immediately in front of the twisting head 25 should then revolve with the same speed of rotation as the cabling disc 24, while the twisting head 33, which is arranged approximately in the middle between the twisting closer 21 and the twisting head 25, revolves with about one-half the speed of rotation of the cabling disc 24.

Figure 4:
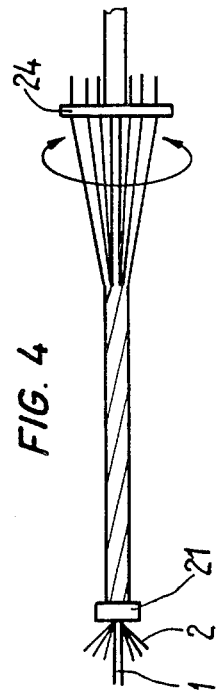
FIG. 4 is a similar view of the second modification to the embodiment of FIG. 2.

FIG. 4 shows an embodiment in which the twisting (unroping) head 25 is not provided. As a result, the core strand 1 is covered by the elements 2 to be stranded, over a length that differs with respect to time between the twisting closer 21 and the further cabling disc 24.

In the following, a design example will be given which relates to the stranding of a multi-wire circular copper conductor for power cables consisting of 19 wires with a diameter of 1.4 mm each with a pattern $1+6+12$.

$1+6$ wires run untwisted as the core strand into the stranding apparatus; 12 wires are cabled onto the core strand with alternating direction of lay and a length of lay $s=150$ mm. The distance between the twist reversal points is 1.50 m and the pulling off velocity is $v_o=100$ m/min.

The stranding apparatus consists of two cabling discs 22 and 24 each with one feed-through opening for the core strand and 12 feed-through openings for the wires. The cabling discs have a spacing of 4.5 m. Both rotate synchronously with the speed of rotation $n=v/s=667$ r.p.m. in alternating directions.

The distance between the two twisting heads 21 and 25 is likewise 4.5 m. The core strand and the temporarily applied outer layer continuously alternate their length of lay in the region between the twisting heads 21 and 25 between infinity and 450 mm. In the region between the twisting heads 25 and 23, the temporary torsion of the core strand is practically completely cancelled.

What is claimed is:

1. A method for the layerwise stranding of elements to be stranded, especially of elements of electric cables, about a flexible core strand, in which the elements to be stranded continuously run off from stationary supplies and are temporarily run concentrically to the core strand which is held stretched, whereby stranding lays are stored, and in which the elements to be stranded are subsequently guided around the core strand in directions alternating at intervals and in the process are cabled onto the core strand, which is guided in a manner secure against torsion, with a definite length of lay and with alternating direction of lay, comprising, for the purpose of temporary storage of stranding lays, the elements to be stranded (a) first temporarily cabling the elements to be stranded onto the core strand with a direction of lay alternating at intervals by means of torsioning the core strand;

(b) roping down the elements from the core strand by leading the elements to be stranded around the core strand synchronously with the final stranding; and (c) then feeding the elements spaced from and parallel to the core strand, which is conducted freely torsionable, or to the stranding axis, respectively, to the final cabling operation.

2. Apparatus for the layerwise stranding of elements to be stranded, especially of elements of electric cables, about a flexible core strand, comprising (a) stationary supplies for the elements to be stranded;

(b) a pull-off device;

(c) a take-up device for the cabled material;

(d) a cabling device arranged in between for stranding the elements to be stranded, including an oscillating cabling disc and, for guiding the elements to be stranded, a further cabling disc arranged at a distance ahead thereof, the further cabling disc mechanically coupled to the oscillating cabling disc with respect to the rotary motion of the latter; and (e) a twisting closer arranged ahead of the further cabling disc for accepting the core strand as well as the elements to be stranded having a distance (a) from the further cabling disc, the further cabling disc being at a distance (b) from the oscillating cabling disc, both of said distances being greater than the distance (c) of the twist reversal points in the finished stranded material.

3. Apparatus according to claim 2, wherein said oscillating cabling disc and said further cabling disc form the end faces of a twisting cage which further includes guides for the elements to be stranded.

4. Apparatus according to claim 3 wherein said further cabling disc is disposed for axial movement back and forth.

5. Apparatus according to claim 4 and further including a roping down head arranged immediately ahead of said further cabling disc.

6. Apparatus according to claim 5 and further including one or more twisting heads which tensionally embrace the stretched material to be stranded from the outside and revolve about the cabling axis with alternating direction of rotation disposed between the further cabling disc and the twisting closer.

7. Apparatus according to claim 2 and further including a tubular guide for the flexible core strand disposed between said oscillating disc and said further cabling disc.

8. Apparatus according to claim 2 wherein said further cabling disc is disposed for axial movement back and forth.

9. Apparatus according to claim 2 and further including a roping down head arranged immediately ahead of said further cabling disc.

10. Apparatus according to claim 2 and further including one or more twisting heads which tensionally embrace the stretched material to be stranded from the outside and revolve about the cabling axis with alternating direction of rotation disposed between the further cabling disc and the twisting closer.

* * * * *